INVENTOR.
YUEN-SHENG CHIANG
PETER L. DE PERRO
SAMUEL WEI-HSING ING, JR.
BY Ronald Zibelli
ATTORNEY

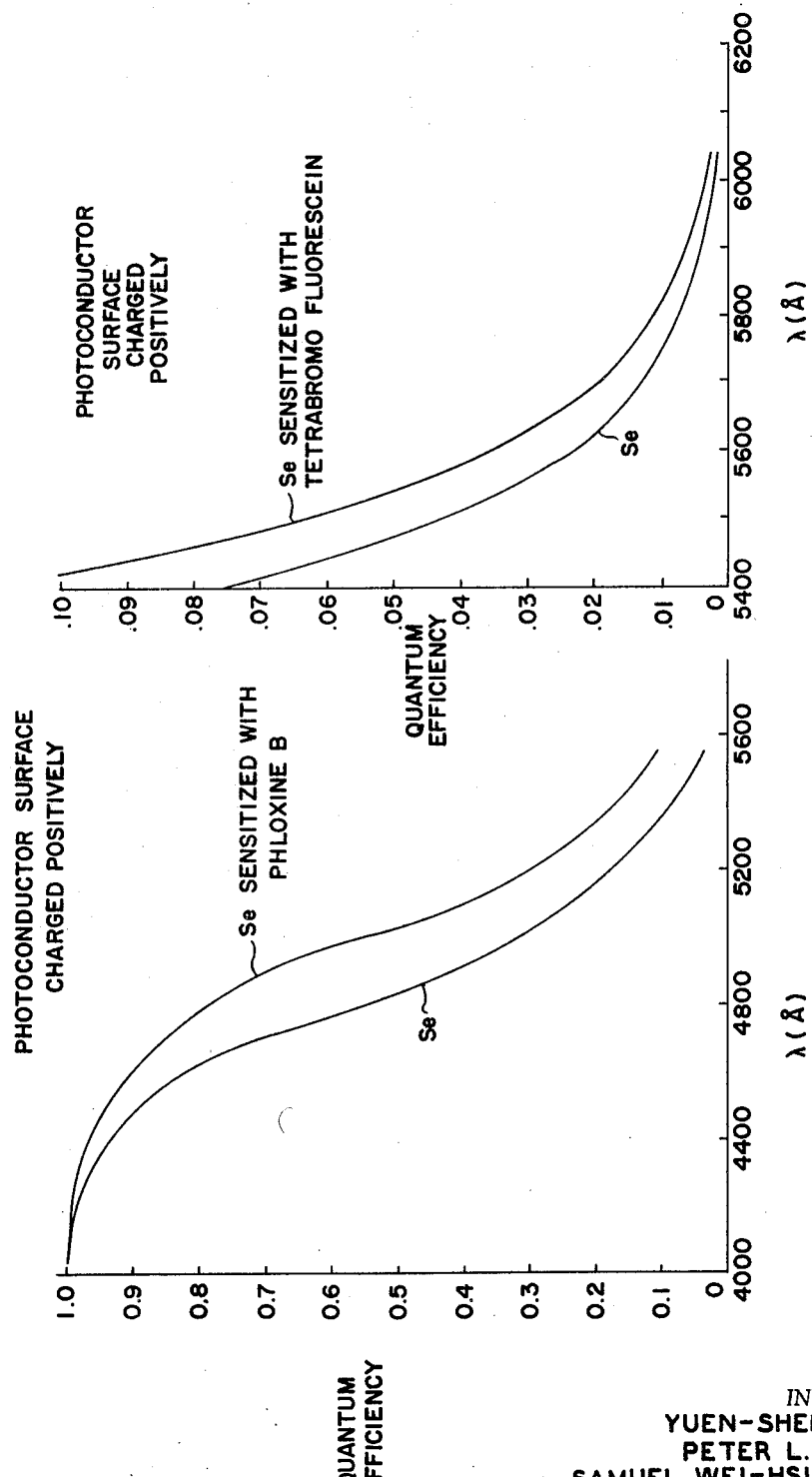

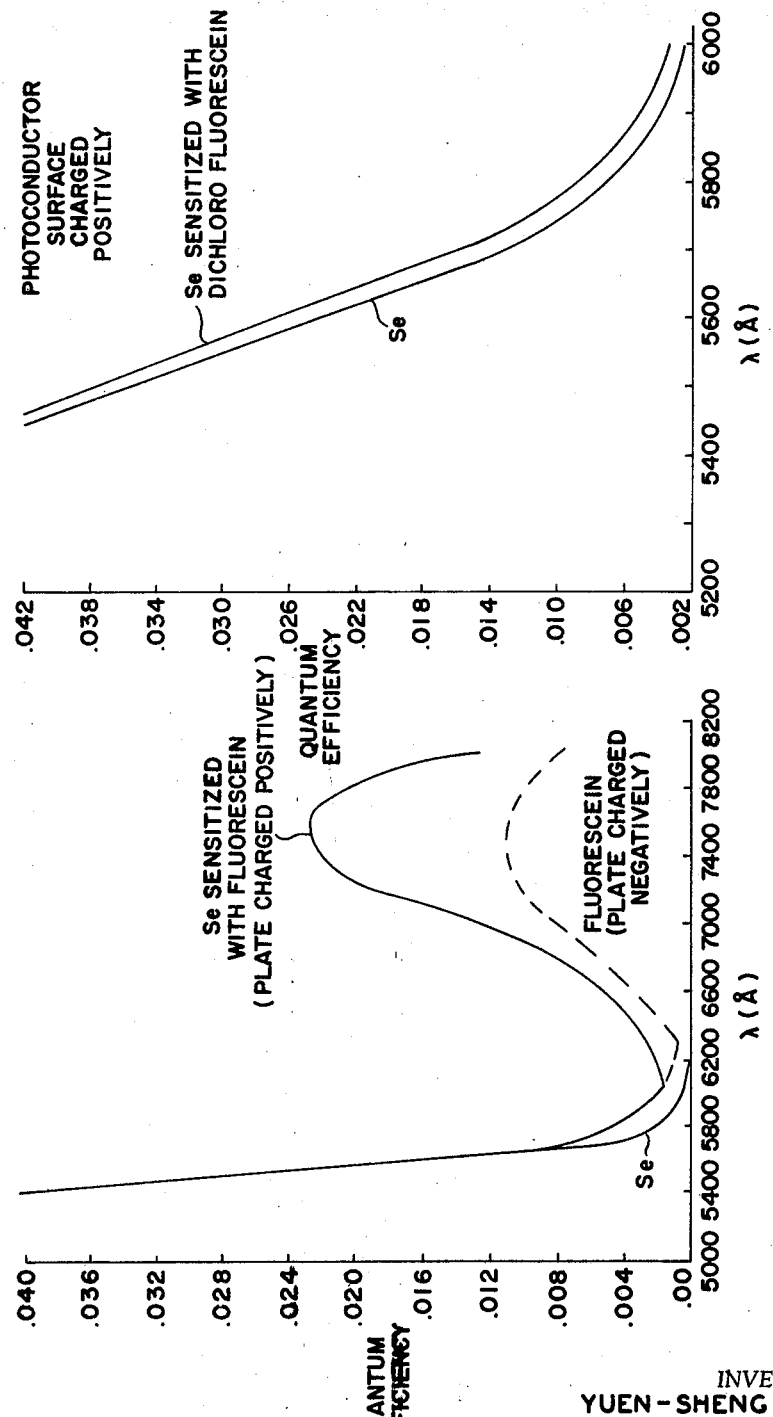

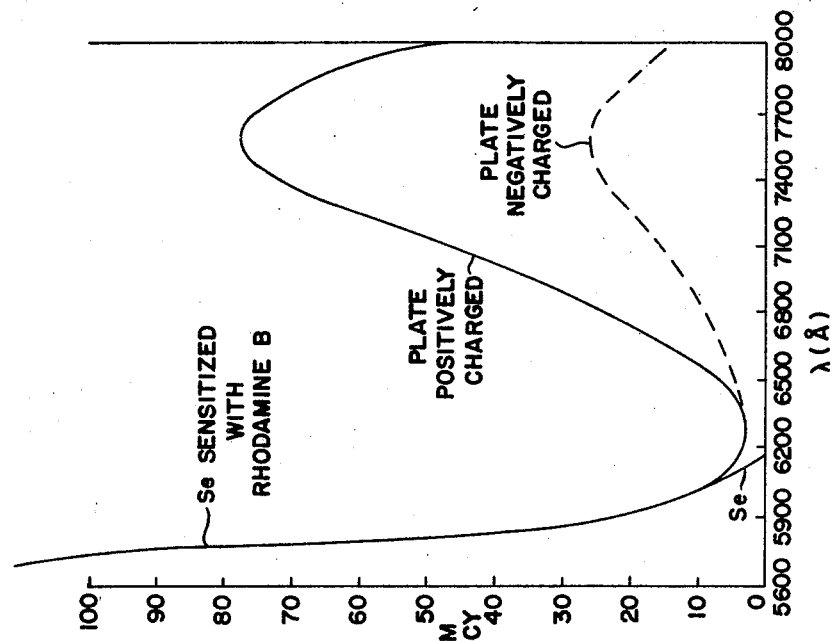
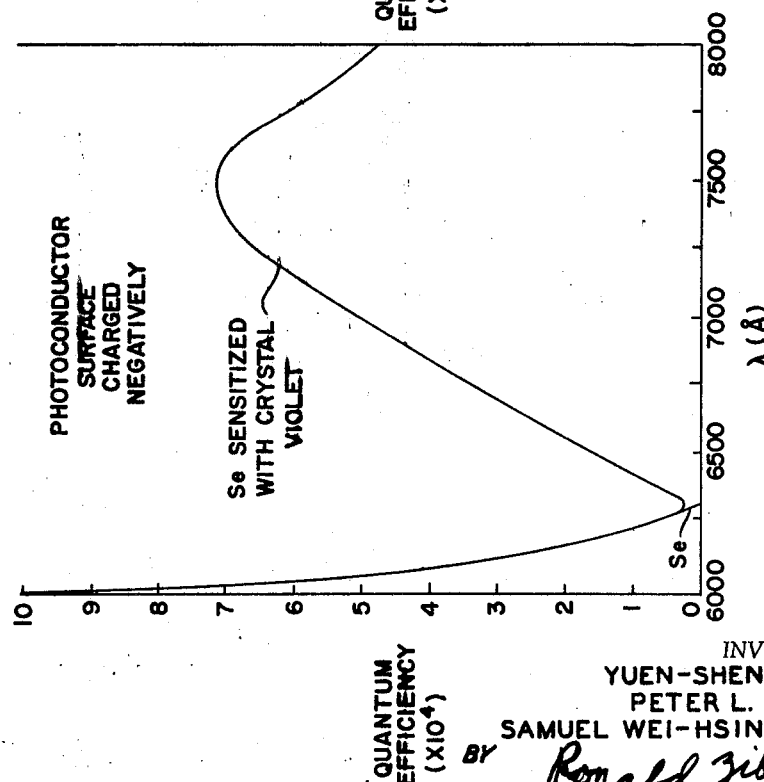

3,498,835
METHOD FOR MAKING XEROGRAPHIC PLATES

Yuen-Sheng Chiang, Peter L. DePerro, and Samuel Wei-Hsing Ing, Jr., Webster, N.Y., assignors to Xerox Corporation, Rochester, N.Y., a corporation of New York
Filed June 28, 1966, Ser. No. 561,239
Int. Cl. C23c 11/00, 13/02
U.S. Cl. 117—227                    9 Claims

ABSTRACT OF THE DISCLOSURE

This application relates to a process for producing xerographic plates wherein selenium and at least one organic dye sensitizer are co-evaporated and deposited upon an electrically conductive backing member. In one particular embodiment, the selenium and the dye sensitizer material are co-evaporated until a steady state equilibrium condition is established. The subsequent deposit upon the conductive backing member comprises a homogeneous dispersion of vitreous selenium and the organic dye sensitizer material.

---

Figure 2:
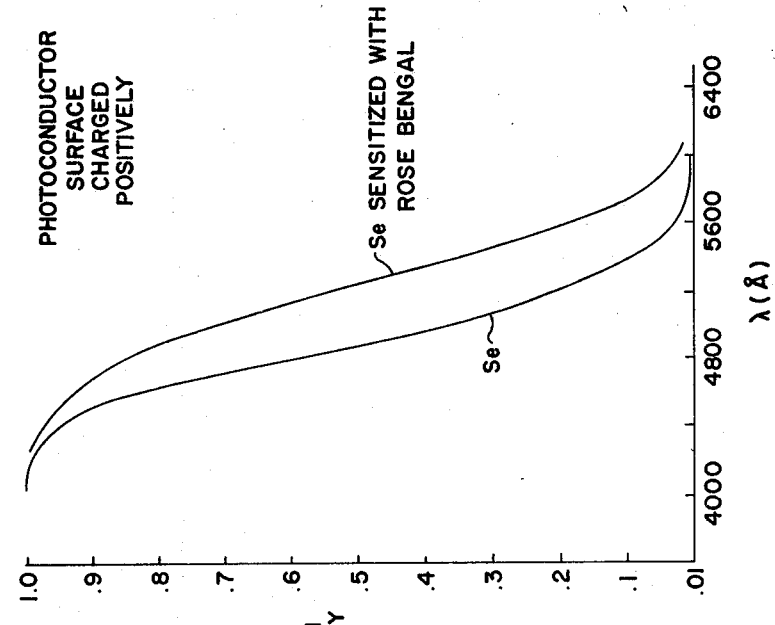

This invention relates in general to xerography and in particular to xerographic plates, a xerographic process using such plates and to a process for the production of such plates. More specifically, the invention relates to a new xerographic plate comprising a relatively conductive backing having on at least one surface thereof a dye-sensitized coating comprising a substantially homogeneous mixture of vitreous selenium and an organic dye sensitizer.

In the xerographic process as described in U.S. 2,297,691 to C. F. Carlson, a base plate of relatively low electrical resistance such as metal, paper, etc., having a photoconductive insulating surface coated thereon, is electrostatically charged in the dark. The charged coating is then exposed to a light image. The charges leak off rapidly to the base plate in proportion to the intensity of light to which any given area is exposed; the charge being substantially retained in non-exposed areas. After such exposure, the coating is contacted with electroscopic marking particles in the dark. These particles adhere to the areas where the electrostatic charges remain forming a powder image corresponding to the electrostatic image. The powder image can then be transferred to a sheet of transfer material resulting in a positive or negative print, as the case may be, having excellent detail and quality. Alternatively, when the base plate is relatively inexpensive as in the case of paper, it may be desirable to fix the powder image directly to the plate itself.

As discussed in Carlson, photoconductive insulating coatings comprise anthracene, sulfur, or various mixtures of these materials such as sulfur with selenium, etc., to thereby form uniform amorphous coatings on the base material. These materials have a sensitivity largely limited to the shorter wavelengths and have a further limitation of being only slightly light-sensitive. Consequently, there has been an urgent need for improved photoconductive insulating materials.

The discovery of the photoconductive insulating properties of highly purified vitreous selenium has resulted in this material becoming the standard in commercial xerography. The photographic speed of this material is many times that of the prior art photoconductive insulating materials. Such a plate is characterized by being capable of receiving a satisfactory electrostatic charge and selectively dissipating such a charge when exposed to a light pattern. However, vitreous selenium suffers from the serious defect that its spectral response is very largely limited to the blue or near ultra-violet portion of the spectrum.

Now, in accordance with the present invention, it has been found that an improved xerographic plate having increased spectral sensitivity can be prepared by homogeneously incorporating in the photoconductive insulating coating a minor amount of an organic dye sensitizer. The plates as thus modified are characterized by a broader range of spectral sensitivity, particularly toward the red end of the spectrum.

In general, the range of concentration or proportion of organic dye sensitizers in the selenium photoconductive layer includes quantities up to and including about 5% by weight of the vitreous selenium-organic dye sensitizer mixture and, preferably lies in the range of about 0.001 to about 1% by weight. At percentages substantially above 5%, many sensitizers tend to segregate to the photoconductive insulator surface thereby substantially altering the desirable physical characteristics of that layer.

The new and improved xerographic plates of the present invention are preferably prepared by a co-evaporation technique. By using this approach, as hereinafter disclosed, the organic dye sensitizer is uniformly and homogeneously dispersed throughout the deposited photoconductive layer. In addition to the increase in spectral response, since a homogeneous layer is deposited its sensitivity is uniform over its entire applicable surface as well as throughout the depth of the photoconductive layer. This latter result is of importance because a substantial proportion of the incident light is absorbed and uniform sensitivity can only be obtained if the composition of the photosensitive layer is uniform. This is a distinct advantage over a surface sensitization where the sensitivity of the surface is vastly different from the sensitivity of the internal portions. Furthermore, erosion of the uppermost portion will not destroy the effectiveness of the homogeneous layer as it would when a surface sensitized layer is used. These advantages are a direct result of the utilization of the herein disclosed co-evaporation techniques.

Selenium and the dye sensitizer are placed in separate sources in a high vacuum vessel and are heated to volatize their contents at a desired deposition ratio. When a steady state equilibrium is reached, a shutter separating the sources from the conductive backing is removed and the evaporation is permitted to continue until the desired depth of photoconductive insulator layer is deposited upon the conductive substrate. The shutter is then reinserted between the containers and the conductive backing to prevent further deposition, the heating units are turned off and the entire apparatus cooled to room temperature.

Figure 1:
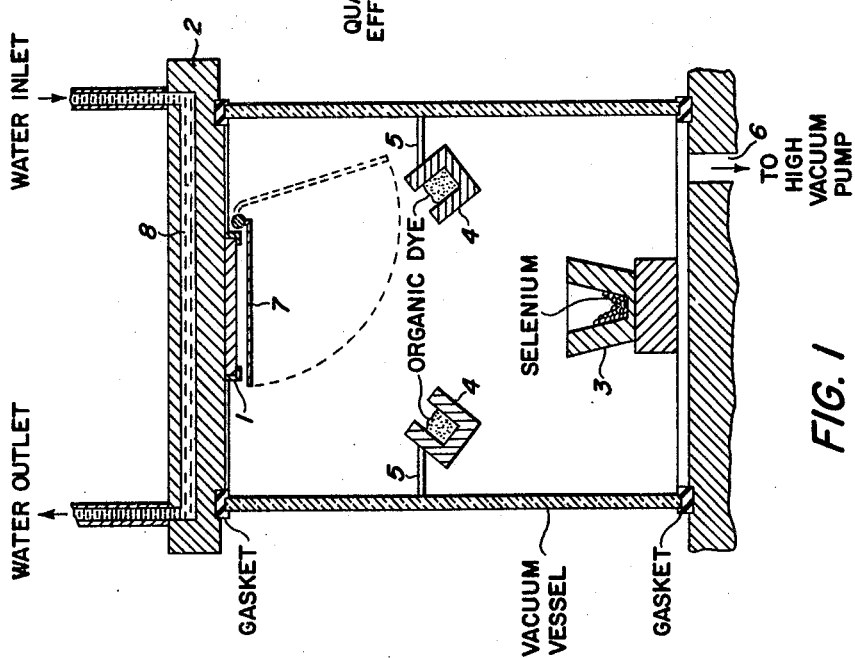

FIGURE 1 is an illustrative example of the type of apparatus which can be used in preparing the improved xerographic plates of the present invention. A clean conductive plate 1 is attached to a temperature controlled platen 2 a fixed distance above a selenium container 3. The temperature of the plate may be controlled in any suitable manner, such as by the passage of water through a suitable conduit 8 in the platen, etc. The plate temperature is maintained at a level whereby vitreous selenium is deposited during the deposition process. Thus, temperatures on the order of 100° C. may be used, provided the time of deposition is relatively short; whereas lower temperatures are most commonly used with longer periods of deposition. Preferably, the temperature of the plate is held between about 20–75° C. Above 75° C. for relatively long periods of deposition, there is obtained an increasing proportion of crystalline rather than vitreous selenium; and below about 20° C., it has been found that the xerographic plates so produced do not have the normal and desirable photoconductive insulating properties.

A temperature controlled container 3 holding purified selenium is placed in the bottom of the deposition vessel. A plurality of temperature controlled containers 4 each holding a quantity of an organic dye sensitizer are placed intermediate the selenium container 3 and the conductive backing 1. The mouths of the organic dye holding containers 4 are approximately 5–15 inches from the conductive backing 1. The containers 4 are supported by any suitable movable means 5.

A vacuum is drawn on the vessel by means of a high vacuum pump (not shown) connected to the deposition vessel by conduit 6 and with movable shutter 7 in the closed position, the respective containers are heated to the appropriate temperatures until a steady state equilibrium condition is reached. The pressure in the vessel may range from 1 to $10^{-3}$ microns of mercury. The selenium is maintained at a temperature above its melting point and at a point where its vapor pressure is sufficient to provide substantial deposition on the conductive backing. At the other extreme, the selenium should not be maintained at a temperature which provides (1) too great a rate of evaporation so that the dye material is not homogeneously dispersed through the deposited layer or (2) insufficient dye is trapped in the deposited layer. Temperatures of between 230°–300° C., preferably about 270° C., are sufficient to give the desired deposition rate and, in conjunction with the appropriate temperature conditions for the organic dye containers, to attain the desired sensitized-selenium layer. The organic dye holders are held at a temperature whereby the dye is converted into the vaporous state in amounts sufficient to provide homogeneous dispersion of that material throughout the deposited selenium layer. The temperature should not be maintained at such a high level that there is a possibility that the dye might decompose. Temperatures on the order of about 190°–220° C., preferably about 200° C., are sufficient for most organic dyes. The selection of a particular temperature at which to hold the organic dye material depends on many factors such as the decomposition point, the vapor pressure, the ambient pressure, etc., and it is conceivable that for a particular organic dye the appropriate temperature may fall outside the range heretofore specified. It should be understood, however, that the selected temperature is determined on the basis of the aforesaid physical characteristics rather than merely operating within the temperature range previously indicated as being sufficient for most dyes.

Sufficient selenium and organic dye should be used so an equilibrium condition may be maintained throughout deposition. In this manner, a uniformly homogeneous sensitized layer is deposited on the conductive backing. In other words, excess selenium and organic dye should be placed in the container so that at no time during the deposition process will the vaporous components be present without a corresponding solid or liquid phase. Under equilibrium conditions, the selenium may be in either the liquid or solid phase, depending on the ambient conditions, whereas the organic dye will normally be in the solid phase. If insufficient quantities are utilized the equilibrium condition would be destroyed and the deposited layer would not be uniformly homogeneous.

The rate of deposition is limited only by the rates of evaporation of the respective materials at ambient conditions. In essence, however, the deposition rate is limited by the rate of evaporation of the more sensitive material, namely, the organic dye. In general, the dyes have a relatively low vapor pressure even at elevated temperatures. Increases to yet higher temperatures is limited by fear of decomposition. Such a decomposition would, of course, obviate the desirable results as heretofore set forth. Accordingly, the rate of evaporation of the selenium is limited so that sufficient dye material is homogeneously trapped throughout the photoconductive insulator layer as it is deposited upon the conductive backing. While rates of 5–20 microns per hour are easily obtainable, it is contemplated that under appropriate conditions with suitable apparatus any desired rate of deposition can be obtained. The advantageous results set forth in this application are not entirely dependent upon the optimum rate of deposition; so long as the spectral response of the xerographic plate is increased, it should be understood that such plates, and the coevaporation processes used to obtain such plates, are within the scope of this invention regardless of the rate of deposition of the photoconductive insulating material.

The concentration of the sensitizing material in the resultant selenium photoconductive insulator layer depends, inter alia, on the following variables: (1) the temperature of the conductive backing, (2) the temperature of the selenium holder, (3) the temperature of the sensitizing material holders, (4) the relative openings of the respective holders, and (5) the distance the holders are placed from the base plate. Thus, for a fixed distance between the selenium holder and the conductive backing and all ambient conditions being constant, the proportion of sensitizer in the deposited layer can be increased by (1) raising the temperature of the sensitizer holders so as to increase the rate of evaporation of the organic material, (2) moving the dye holders closer to the conductive backing, or (3) increasing the number of dye holders, etc.

The general scope and nature of the invention having been set forth, the following example is given as a typical illustration of a method by which the desired xerographic plates may be prepared. A cleaned aluminum plate approximately 3 inches wide, 3 inches long, and ⅛ inch thick is attached to a temperature controlled platen about 20 inches above a selenium container. This distance remains fixed during the deposition process. The temperature of this aluminum plate is held at about 50° C.

A temperature controlled aluminum container having a circular mouth 2½ inches in diameter holding approximately 20 grams of purified selenium is placed in the bottom of the deposition vessel. Two temperature controlled aluminum containers each containing about 2 grams of Rose Bengal free-acid are placed intermediate the selenium container and the aluminum plate with the mouths of the containers being approximately 10 inches from the aluminum plate.

Air is evacuated from the air tight vessel until a pressure of about $10^{-2}$ micron is reached. With the shutter in the closed position, the selenium container is heated to 270° C. and the Rose Bengal containers are heated to 200° C. After sufficient time has passed for the materials to reach an equilibrium state, the shutter is removed and the deposition is permitted to take place. Deposition continued for approximately 2 hours. The homogeneous Rose Bengal sensitized-selenium layer so obtained is approximately 20 microns thick.

Any suitable dye sensitizers may be used in the practice of this invention. Typical sensitizers include Rhodamine B, Crystal Violet and those having the formula:

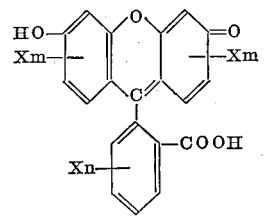

wherein X is either a halogen or a hydrogen atom, $m$ is an integer equal to 0, 1, 2, or 3; and $n$ is an integer equal to 0, 1, 2, 3, or 4.

Rhodamine B (C.I. 45170) has the following structure:

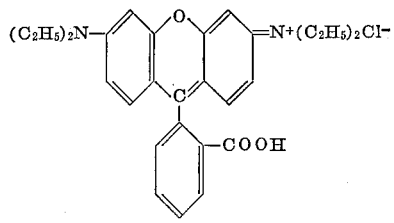

Crystal Violet (C.I. 42555) has the following structure: (Fieser & Fieser, Organic Chemistry, Third Edition, page 893, 1956, Library of Congress Card No. 56-6691):

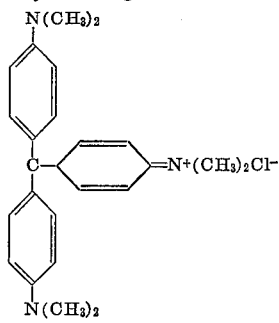

The following organic dye materials are considered exemplary of compounds falling within the scope of the aforesaid general formula:

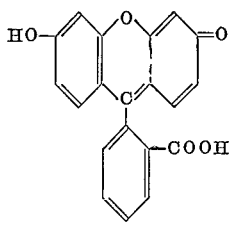

Fluorescein (C.I. 45350); Fieser & Fieser, supra, p. 897

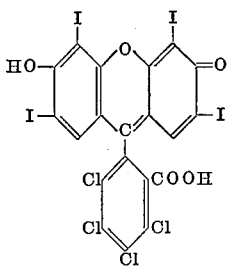

Rose Bengal—free acid (C.I. 45440)

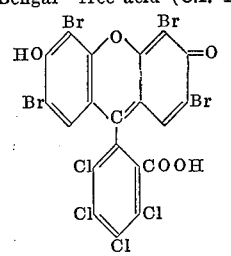

Phloxine B—free acid (C.I. 45410)

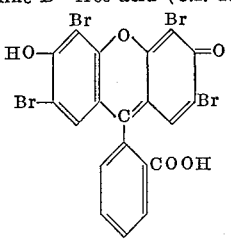

Tetrabromo-fluorescein (C.I. 45380A) (Eosin Yellow)

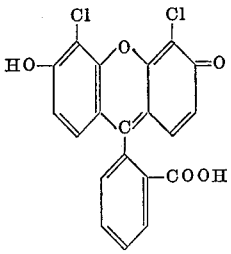

Dichloro-fluorescein

The dye sensitizers may be used singly or in combination to enhance the spectral response of the photoconductive layer to electromagnetic radiation in the visible portion of the spectrum. For example, a dye which enhances response in the 4000–6000 A. wavelength portion of the spectrum may be incorporated in conjunction with a dye that enhances response in the 6000–8000 A. wavelength portion.

The sensitivity of the xerographic plates prepared in accordance with the coevaporation process is measured by a photo-discharge technique. The photoconductive insulator coated substrate is placed on a movable support, uniformly electrostatically charged by an air corona, and then exposed to monochromatic light. In all measurements the light is angularly incident upon the photoconductor surface opposite to that of the supporting substrate which is held at zero potential. The voltage decay of the photoconductor insulator material upon photon excitation is monitored by an electrostatic probe. Because of the insulating nature of the photoconductor insulator film and the non-injecting characteristics of the probe, the dark decay rate is slow; in any event, the voltage decay is measured within seconds after the electro static charge is placed uniformly over the photoconductor insulator surface. The signal received by the probe is fed into an electrometer and the output of the electrometer is fed into a differentiator. The differentiator signal is recorded; its amplitude being proportional to the voltage decay rate. The quantum efficiency, a measure of the sensitivity of the xerographic plate, is derived from the number of electrons generated per absorbed photon. The number of electrons generated per second can be calculated from the initial voltage decay rate $(dv/dt_0)$. The photon flux is calibrated against a standard photo-cell with the actual photon absorption being the incident photon flux minus the reflected photon flux (usually about 25% at all wavelengths). The calculations made are based on the assumption that the selenium plate, used as the standard, has a quantum efficiency of one under illumination of light of 4,000 A. wavelength (Paul J. Regensberger, J. of Applied Physics, 35, p. 1863, 1964).

FIGURE 2 is a graph showing the spectral response curves of a selenium xerographic plate contrasted with the Rose Bengal sensitized selenium plate produced in accordance with the above example. The Rose Bengal-selenium curve actually represents a family of curves for sensitized layers containing about 0.001 to about 0.1% sensitizer.

FIGURES 3–8 represent similar graphs showing the contrast in spectral response between selenium xerographic plates and sensitized plates containing, respectively, Phloxine B, tetrabromo-fluorescein, dichlorofluorescein, fluorescein, Rhodamine B, and Crystal Violet. The incorporation of these sensitizers into the photoconductive insulating material is conducted in accordance with the procedures previously set forth.

FIGURES 6, 7, and 8 show that while the sensitivity of selenium is not appreciably increased up to wavelengths of approximately 6,000 A., the addition of fluorescein, Rhodamine B, or Crystal Violet materially increases the sensitivity at wavelengths greater than 6,000 A. The sensitivity of the unsensitized selenium in this latter portion of the visible spectrum is so low that it is off the graph. In other words, the addition of the electron donor organic dyes increases the sensitivity of the selenium plate in the red portion of the spectrum by several orders of magnitude.

The selenium used in the preparation of xerographic plates should be free of impurities which adversely effect its ability to hold electrostatic charges, that is, by forming conducting paths in the film or promoting the formation of conducting hexagonal selenium so that electrostatic charges leak off rapidly even in the dark and electrostatic deposition of powder or other finely-divided material can not be obtained. Preferably, there should be used vitreous selenium available in pellet form 1/17 inch to 1/8 inch size under the name "ARQ" (ammonia reduced in quartz from selenium oxide) as manufactured, for this grade of selenium is essentially pure, containing less than about 20 parts per million of impurities. If purified, other grades of selenium, i.e., "DDQ" (double distilled in quartz) and "CCR," commercial grade) as manufactured, can likewise be employed in the process disclosed herein. Procedures to purify these grades of selenium are well known in the art; accordingly, they will not be discussed here.

Other materials such as alloy of selenium with minor amounts of arsenic, tellurium, sulfur, etc., can also be used as the photoconductive insulating material in the practice of the present invention. If such alloys are used, each ingredient, including the organic dye sensitizer, can be evaporated from separate vessels, or, in the alternative, the selenium alloy can be formed prior to the sensitization deposition and thus will be evaporated from a single source. While the nature of the selenium layer has been described as vitreous, the exact molecular structure it not known, the term being used as descriptive of its physical appearance. It is believed that the selenium is present substantially in an amorphous form containing minor proportions of a crystalline form of selenium, although it is not desired to restrict this invention to the presence of such a mixture of forms. It is, therefore, to be understood that the various crystalline or amorphous structures included in the vitreous-appearing form of selenium are likewise to be included in the term "vitreous" as used herein and in the claims. It is likewise to be understood that the term "selenium" includes not only pure selenium but also selenium that may be modified by a controlled amount of an additive, such as noted above, that is consistent with the retention of useful photo-conducting properties.

A conductive backing is usually required for xerographic plates and metal forms the most suitable material. However, a high conductivity is not required and almost any structurally satisfactory material which is more conductive than the organic dye sensitized selenium layer can be used. Materials having electrical resistivities about $10^{10}$ ohm-cm. are generally satisfactory for the base plate of this invention although it is more desirable to use materials of less than about $10^5$ ohm-cm. Any gross surface irregularities, i.e., burns, tool marks, are removed from the base plate by grinding or polishing although it is unnecessary to polish the plate until it has a mirror-like surface. The conductive backing surface is cleaned before coating with the dye sensitized-selenium in order to remove grease, dirt, and other impurities which might prevent film adherence of the coating to the base plate. This is readily accomplished by washing the plate with any suitable alkali cleaner or with a hydrocarbon solvent such as benzene, followed by rinsing and drying. Suitable backing materials are aluminum, glass having a conductive coating thereon as of tin oxide, (NESA glass) or aluminum, stainless steel, nickel, chromium, zinc, and steel.

Also, conductive plastic, conductively coated paper, or other web or film-like member may be used as the conductive supporting surface as desired. It is to be understood that the backing members elected for this plate may be in the form of a flat plate or may equally be in the form of a cylinder flexible sheet, or other member having a surface suitable for the xerographic process.

The xerographic member of the present invention may be used as the light-sensitive member in any of the regular xerographic processes. The member is electrically charged to a potential of the order of about 100 to 800 volts by any method well known in the art. The charged member is then exposed to a light image whereby there is a selective dissipation of the electrostatic charge. The resulting latent electrostatic image can be developed, i.e., made visible, by treatment with an electroscopic material and, optionally, the developed image can be transferred to a support member to yield a xerographic print. Modifications and variations of this process need not be considered as they are well known to those skilled in this art.

The manner of electrically charging the xerographic member is not at all critical. The charge can be either positive or negative in polarity. Excellent xerographic copies have been obtained when the xerographic plate is sensitized with an electron acceptor organic dye, such as Rose Bengal, Phloxine B, tetrabromo-fluorescein, and dichloro-fluorescein, and the plate is positively charged. Additionally, excellent xerographic copies have been obtained when the plate is sensitized with electron donor organic dyes, such as fluorescein, Rhodamine B, and Crystal Violet, and the plate is negatively charged. A tungsten light is the source of the imaging light in the production of each xerographic copy.

It is recognized that the organic dye sensitizers which are shown by this application to improve the spectral response of xerographic plates are well known in the art of sensitizing zinc oxide photoconductive insulator layers. However, prior to this application such materials have not been known to be used to sensitize vitreous selenium photo-conductive layers. Additionally, the sensitization of zinc oxide binder plates is considered to be a sensitization only on the surface of the zinc oxide particles resulting in a non-uniform dispersion of the sensitizer throughout the photoconductive layer. This is in contrast to the present invention wherein the sensitizing material is uniformly and homogeneously dispersed throughout the selenium layer by means of the coevaporation technique.

While the invention has been described with reference to preferred embodiments thereof, it will be understood by those skilled in the art that various changes in form and details may be made without departing from the true spirit and scope of the invention.

Further, provided the advantageous results of this invention are not adversely affected, additional operations may be performed to achieve the herein disclosed results, or in certain circumstances, certain operations may be deleted as will be apparent to those skilled in the art. The apparatus herein disclosed may be modified in numerous ways, to once again, achieve the increase in spectral response of the vitreous selenium xerographic plates. All such additions, deletions, modifications, etc., are considered to be within the scope of the present invention.

What is claimed is:

1. The process of producing a xerographic plate comprising co-evaporating selenium and at least one organic dye sensitizer and depositing the vaporized selenium and organic dye onto an electrically conductive backing member.

2. The process of claim 1 wherein said materials are deposited after a steady state equilibrium condition is reached.

3. The process of producing a xerographic plate comprising co-evaporating selenium and at least one organic dye sensitizer, establishing a steady state equilibrium condition between the solid and vaporous phases of said selenium and said organic dye, and depositing a homogeneous dispersion of vitreous selenium and said organic dye sensitizer upon a conductive backing member.

4. The process of claim 3 further including the step of terminating deposition while said equilibrium condition exists.

5. The process of claim 3 wherein the selenium and said organic dye sensitizer are evaporated under a pressure equivalent to between about 1 and about $10^{-3}$ microns of mercury.

6. The process of claim 3 wherein the selenium is evaporated from a source held at a temperature between about 230–300° C.

7. The process of claim 3 wherein said organic dye sensitizer is evaporated from a source held at a temperature below the decomposition point of said organic dye, said temperature being sufficient to cause conversion of said organic dye in sensitizing quantities from its initial state to the vaporous state.

8. The process of claim 7 wherein said organic dye source is held at a temperature of between about 190° and about 220° C.

9. The process of claim 3 wherein the conductive backing member is held at a temperature between about 20–75° C.

References Cited

UNITED STATES PATENTS 3,222,218   12/1965   Beltzer _____ 117—227 X

FOREIGN PATENTS 830,348   3/1960   Great Britain.

WILLIAM L. JARVIS, Primary Examiner

U.S. Cl. X.R.

96—1.6; 117—106, 107